Nov. 4, 1924.
H. ZIEMSS, JR
1,514,243
CHILD'S VEHICLE
Filed June 20, 1921
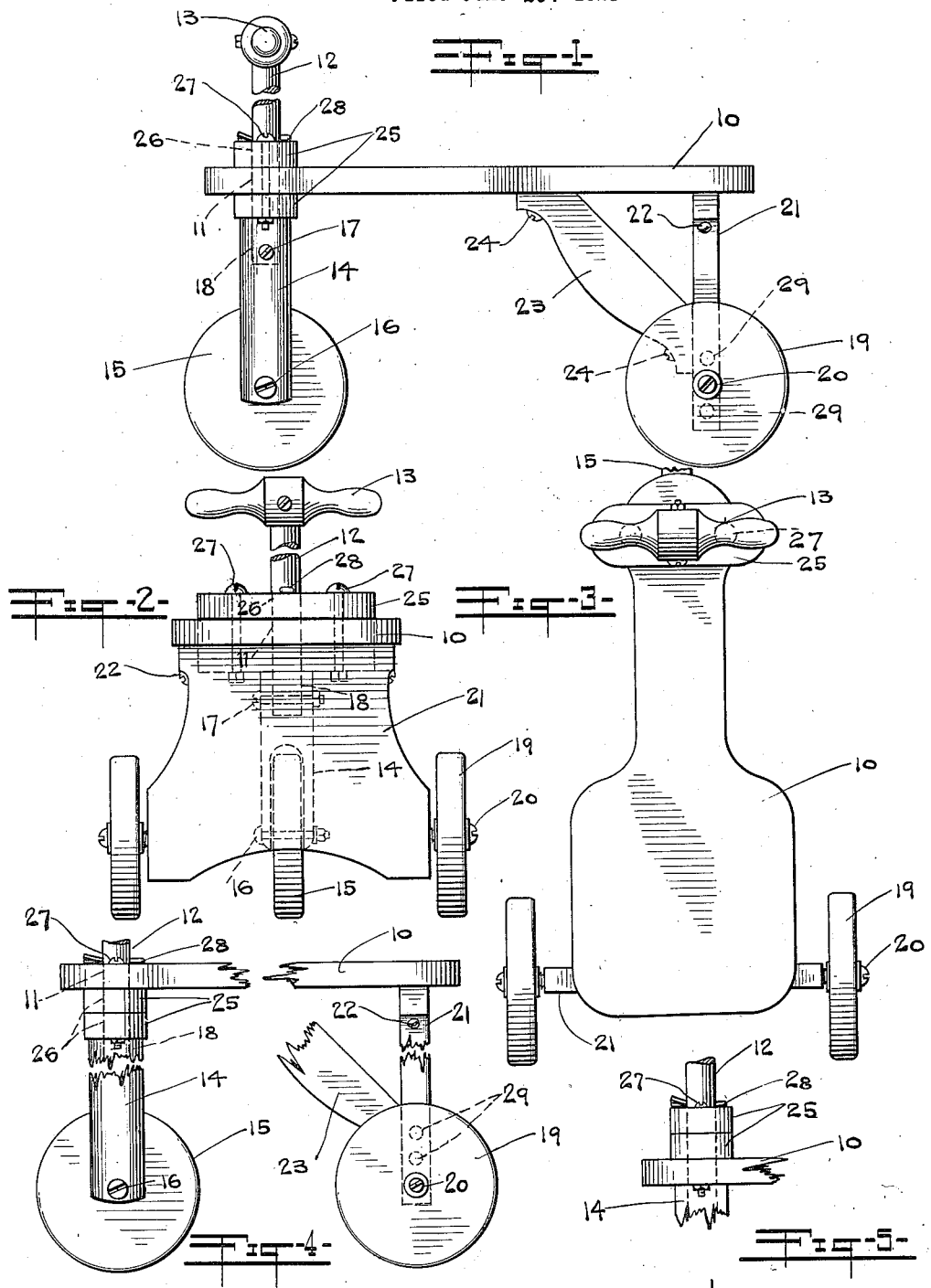
INVENTOR:
HENRY ZIEMSS JR.
By Miller Chindahl Parker
ATTY'S.

Patented Nov. 4, 1924.

1,514,243

UNITED STATES PATENT OFFICE.

HENRY ZIEMSS, JR., OF CHICAGO, ILLINOIS.

CHILD'S VEHICLE.

Application filed June 20, 1921. Serial No. 478,794.

*To all whom it may concern:*

Be it known that I, HENRY ZIEMSS, Jr., a citizen of the United States, residing at Chicago, in the county of Cook and State of Illinois, have invented certain new and useful Improvements in Children's Vehicles, of which the following is a specification.

My invention relates to toy vehicles of the velocipede type and the principal object of the invention is to provide a device of this kind which can very easily be adjusted to change the relative height of the seat thereof to suit the child who is to use the same, and which is equally sturdy and compact in all degrees of adjustment.

Another object is to provide adjusting means for the purpose referred to at the steering post of the car which has the added function of strengthening considerably the connection at this point, preventing wabbling of the post and consequent binding thereof, thereby providing a car which can be steered by the child without noticeable effort.

Other objects and advantages of the invention will appear as the following description progresses. Reference is made to the accompanying drawing in which the same reference numerals are applied to the same parts and wherein Fig. 1 is a side elevation of a vehicle embodying the novel features of my present invention, the same being illustrated with the seat adjusted to a position slightly raised from its normal low-slung position.

Figs. 2 and 3 are respectively rear elevational and top plan views of the vehicle adjusted to the degree illustrated in Fig. 1.

Fig. 4 is a fragmentary view similar to Fig. 1 showing the vehicle elevated to its limit, and Fig. 5 is a fragmentary side elevational detail showing the parts at the head end of the car in low-slung relation.

Referring to the drawing, the reference numeral 10 is applied to the seat member or saddle which, it will be noted, is ample in width at the rear end and is rather narrow at the head end to afford freedom of motion of the legs of the child riding the car. Near the head end of the seat is provided an opening 11 serving as a bearing for a steering post 12 which carries the usual handle bar 13. The steering post terminates in a fork 14 at its lower end which is of increased diameter to provide an annular shoulder to support the seat 10. A steering wheel 15 is rotatable in the fork 14 on an axle 16. The post 12 may be detachably connected to the fork 14 by means of a small bolt 17 which secures the post in a shallow bore 18 in the upper end of the fork.

At the rear end of the car are provided trailing wheels 19 fastened by axle screws 20 to the opposite sides of the bolster 21. The bolster is secured to the nether side of the seat by means of screws 22 and has a brace 23 extending between the bolster and the seat and secured to these members by means of screws 24.

In order to afford a substantial range of adjustment of the height of the seat so that the vehicle may be used by children of different ages or in order that the same child may conveniently use the car and have the same adjusted by stages to suit the requirements of the child in its growth, I prefer to provide in conjunction with the steering post a number of blocks 25 which are adapted to act as shims, the location of which may be changed as desired to vary the relative height of the seat. These blocks are provided with central openings 26 which are adapted to register with the opening 11 in the seat 10. Bolts 27 pass through the blocks 25 and the seat 10 and securely clamp these parts together so that in addition to their function as shims, the blocks, coacting with the seat member provide in effect an elongated rigid bearing unit for the steering post 12, constituting an extension of the bearing 11 in the seat 10. This bearing prevents possible wabbling of the post which is otherwise noticeable and thereby eliminates considerable friction so that a child can steer the car without noticeable effort. No matter what the arrangement of the blocks is, with respect to the seat, the compact bearing just referred to is always formed when the blocks are properly secured together to the seat. The blocks, furthermore, are made ample in length, as shown in Fig. 3, so that they serve as a rest for the child's feet when someone is pushing the car or when coasting.

A cotter pin 28 is preferably provided passing through the steering post above the blocks in order to prevent longitudinal movement of the post when the vehicle is lifted as when carrying it over street crossings.

Openings 29 are provided in the bolster 21 in equally spaced relation, the distance between consecutive openings being equal to the thickness of one of the blocks 25. These openings are adapted to receive the axle screws 20 of the rear wheels 19 in any one of the plurality of adjusted positions afforded thereby. This correlation of the openings 29 with the blocks 25 makes it possible to vary by extremely simple means, the relative height of the seat at both ends of the car to equal degrees so that the seat is always maintained horizontal.

It will, of course, be apparent that the number and thickness of the blocks 25 may be varied as desired and that the spacing and number of openings 25 provided in the bolster may be correspondingly varied as is found necessary or desirable.

The mode of procedure in adjusting the height of the seat, it is believed, requires no considerable explanation. It is apparent that the vehicle may be used with the seat in low-slung relation as shown in Fig. 5 and that when the child has advanced in growth so that a change in the height of the seat is desirable, one of the blocks 25 may be interposed between the seat 10 and the upper end of the fork 14, the other block being left on top of the seat as shown in Figs. 1 and 2. A further adjustment, which in the form illustrated is the extreme adjustment, is afforded by placing both blocks beneath the seat as shown in Fig. 4. Then if further adjustments are desired, these, of course, can be made by the interposition of more blocks, it being understood, of course, that the openings 29 are provided in sufficient numbers and in properly spaced relation in the bolster 21.

It will be apparent from the foregoing that I have provided a very practical form of vehicle which may be constructed at a minimum cost and which is equally as sturdy in one of its degrees of adjustment as in any other degree.

It will be understood that although I have described herein the details of the preferred embodiment of my invention I in no wise limit myself to these details of construction, but cover in addition all legitimate modifications and adaptations of the invention which come within the spirit and scope of the appended claim.

I claim as my invention:

A toy vehicle comprising in combination a seat member, an elongated block adapted to be rigidly fastened to either the upper or lower face of the seat member with its ends projecting laterally to form a foot rest and having an aperture in register with a corresponding aperture in the seat member, means rigidly fastening said block to said seat member, a steering post journalled in said block and seat member and having a shoulder adapted to support the seat member and block, a bolster rigidly mounted on the seat member near its rear end and having openings in its ends spaced apart vertically equal to the thickness of said block and rear supporting wheels having axles adapted for mounting in said openings.

In testimony whereof, I have hereunto set my hand.

HENRY ZIEMSS, Jr.